(No Model.)  2 Sheets—Sheet 2.
R. C. CARPENTER.
STEAM CALORIMETER.

No. 492,710. Patented Feb. 28, 1893.

United States Patent Office.

ROLLA CLINTON CARPENTER, OF ITHACA, NEW YORK, ASSIGNOR TO SCHAEFFER & BUDENBERG, OF NEW YORK, N. Y., AND BUCKAU-MAGDEBURG, GERMANY.

STEAM-CALORIMETER.

SPECIFICATION forming part of Letters Patent No. 492,710, dated February 28, 1893.

Application filed November 10, 1892. Serial No. 451,580. (No model.)

*To all whom it may concern:*

Be it known that I, ROLLA CLINTON CARPENTER, a citizen of the United States, residing at Ithaca, in the county of Tompkins and State of New York, have invented new and useful Improvements in Steam-Calorimeters, of which the following is a specification.

This invention relates to a steam calorimeter or apparatus for determining the amount of water carried in suspension in a current of steam.

It is very important in various industrial pursuits employing steam, to be able to determine by a simple process the weight of water mechanically carried by the steam, first, since this water is an inert substance so far as ability of doing work is concerned, and secondly, it is liable by its presence in large quantities to damage or destroy steam engines which are operated by the steam containing the water. Knowledge of the presence of this water will generally permit the adoption of some means to prevent the damage that would otherwise occur and thus prevent the damage that might be caused should it pass into the engine operated by the steam containing it.

The object of my invention is to provide a simple but accurate calorimeter which is arranged so that a sample of the steam from the steam pipe, shall pass through the calorimeter and thence into the air whence it may be wasted, or drawn into a sewer. The amount of moisture in the steam is determined by a simple calculation, based on the reading of a thermometer inserted in the instrument. The instrument belongs to the class of calorimeters, known as throttling calorimeters and described by Professor C. H. Peabody in the *Journal of the Franklin Institute* August, 1888.

My apparatus is illustrated in the annexed drawings in which

Figure 1:
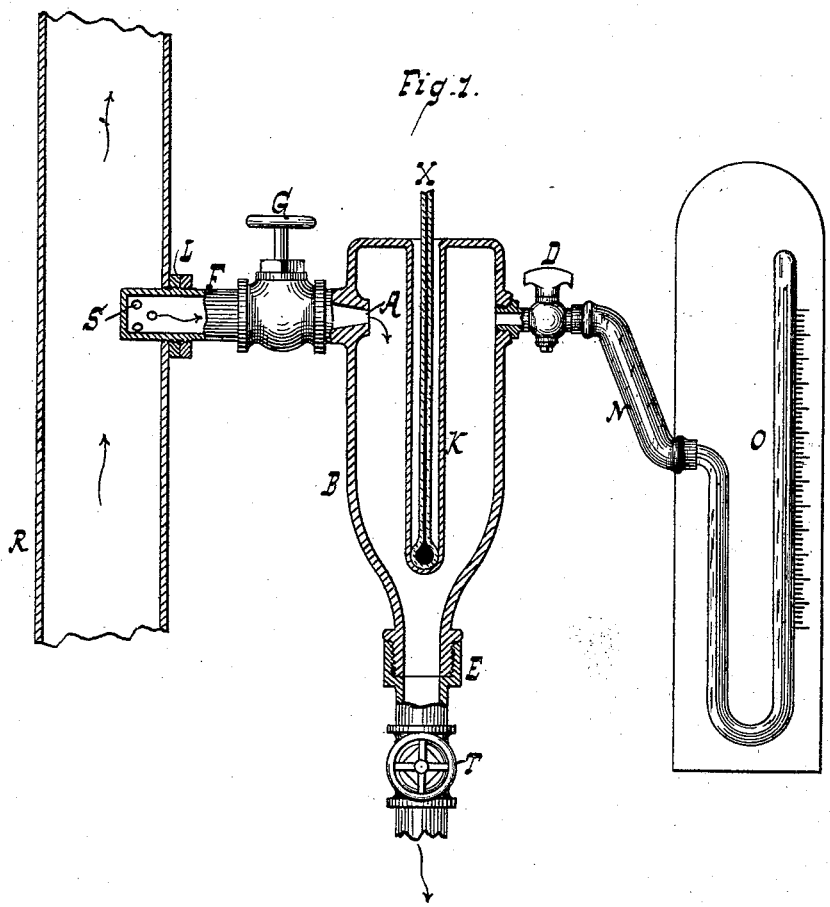
Figure 2:
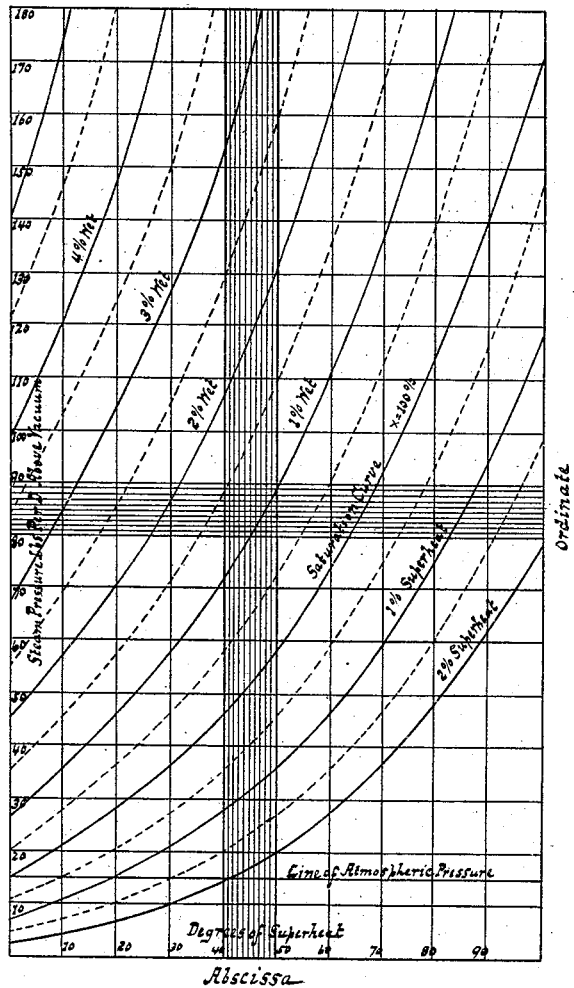

Figure 1 is a sectional side elevation of the calorimeter. Fig. 2 is a diagram or chart used in connection with the instrument.

In the drawings the letter F indicates a pipe nipple of for example one-half inch pipe provided with holes S and screwed some distance into the main steam pipe R. Two lock nuts L L will insure a steam tight joint. The valve G is used for admitting or shutting off steam. On opening valve G to its fullest extent steam blows through the conical or converging passage or mouth A by which operation it is reduced in pressure or to use a technical term is throttled. This steam of lower pressure fills the body B of the calorimeter and surrounds the cup K. The body or vessel B is closed at the top as seen.

By placing into cup K some cylinder oil or mercury and a thermometer X the true temperature of the steam in the calorimeter can be noted. The excess of steam and the water of condensation pass downward and out through the orifice or tube E. A valve T may be applied at the outlet to produce back pressure in the calorimeter.

The actual pressure in the calorimeter can be measured by a gage or manometer O connected by a hose or rubber tube N to the cock D leading from the manometer. This cock will be termed manometer cock. Any suitable pressure gage will answer. For low pressure I intend using a mercury manometer.

The general method of computing the moisture in the steam depends upon the fact, that the heat existing in confined steam of high pressure, will be utilized if the pressure be suddenly reduced without doing work, in evaporating water that may be mechanically carried in suspension in the steam. The complete evaporation of this water will be indicated by a rise of temperature in the calorimeter, above that due to normal or saturated steam of the given pressure existing in the calorimeter. The amount of water so evaporated will depend upon the steam pressure, but at usual pressure of sixty to eighty pounds per square inch by gage will not exceed three per cent. of the total weight of water and steam.

This method is not however new, and I do not claim it as my invention. By simply reading the thermometer X immersed in oil and situated in the cup K and knowing the pressure of the steam before and after entering the calorimeter the moisture in the steam can be ascertained by simple inspection of a diagram. The instruments heretofore constructed, reduced the pressure of the steam by partially opening a valve or by imposing in the steam pipe a diaphragm at right angles to the pipe in which was a small hole. That is the steam is reduced in pressure by passing through the minute crack in a partially open valve or by passing through a small hole in a diaphragm. I found that both these methods of reducing the pressure lead to erroneous determinations. I found that even if the amount of moisture in the main steam pipe was varied to a considerable extent, the calorimeter would not give indications showing such variations. I found that such error was caused by the fact that the water mechanically carried by the steam is in great part deposited or thrown down by meeting any obstacle in its passage; this fact is no doubt largely due to its great weight as compared with steam, the result being that the water in the steam, was thrown out by the obstacle interposed to its passage by the perforated diaphragm or globe valve but slightly opened, and trickled down on the side of the pipe and returned to the main steam pipe by eddies and back currents thus not entering the calorimeter at all. This had the effect of making the sample of steam supplied to the calorimeter carry a less percentage of moisture than that in the main steam pipe, and thus tending to mislead any who depended on its accuracy. To overcome this serious objection, I invented the form shown in the drawings and this I found by actual trial to be free from the errors of the other classes of instruments.

The main body or calorimeter portion of this instrument is constructed as shown in the drawings and consists of a tube with convergent mouth or nozzle A, which is an integral part of the walls of the calorimeter or vessel B or is screwed in place as may be convenient. Through this mouth the steam passes from the pipe R to the calorimeter or body B. The cup K in which a thermometer may be placed is screwed into place or made an integral part of the walls of the calorimeter. The cock D as already stated gives communication to a manometer or pressure gage. The steam passes out of the calorimeter at the passage E, which may be connected to a pipe for leading the steam passing through the instrument to any convenient point.

In place of the cup for supporting a thermometer as shown, a simple hole may be left at the top of the vessel B and the thermometer supported by use of perforated rubber cork or netting, which surrounds the thermometer and prevents the escape of steam above, but it will in general be preferable to use the cup as shown.

In this instrument the full pressure of the steam is received in the large end of the convergent mouth or nozzle A and the pressure is reduced by the steam flowing through the convergent mouth A and suddenly expanding in the vessel B of the calorimeter. Any moisture which is in the steam at the entrance of the tube is guided by the form of this convergent nozzle and finally discharged into the calorimeter without a possibility of being returned to the main steam pipe by any eddies or returning currents of steam. Although in the use of the instrument a valve is placed between the main steam pipe and the convergent nozzle, such valve is in no wise a part of the instrument and when the instrument is in use the valve is to be opened to its fullest extent, so as to afford no impediment to the passage of steam and water.

Another source of error of other calorimeters opposite in character, but uncertain in amount and not in any wise balancing the first error spoken of, is overcome to a great extent by my invention, and that is radiation loss. I observed that a thermometer in calorimeters of the other form placed in the cup in the calorimeters read lower even when the calorimeter was thoroughly wrapped, if exposed to the air than if exposed to a fluid of the same temperature as the steam in the calorimeter. This form I find obviates that loss of heat to a great extent since by this construction steam of high pressure and temperature is in close contact with the calorimeter. The converging tube being a part of the walls of the calorimeter or in metallic contact with these walls receives the heat from the steam of high pressure and conducts this to nearly every portion of the calorimeter surface, thus neutralizing to a great extent all loss from radiation. This has no perceptible effect on the steam in the calorimeter except to protect its exterior from the chilling effect of the air.

The form of the instrument as shown is such as to form a small reservoir of steam, surrounding the thermometer cup, and discharging more or less freely at the opening in the lower portion of the calorimeter.

In the process of using the instrument, steam of known pressure is admitted by opening the valve to its fullest extent, the manometer pressure above atmosphere is observed. The excess of temperature in the calorimeter above 212° is noted and this is diminished by three-fourths times the calorimeter pressure above atmosphere. By using the first quantity that is the absolute pressure of the steam before it enters the calorimeter as ordinate the second as abscissa in the accompanying diagram, the percentage of moisture is shown directly. Thus for example if the steam pressure by gage is eighty pounds corresponding to 94.7 pounds absolute, the pressure in the calorimeter is eight pounds above atmosphere and the temperature shown by the thermometer 274.2. We have 274.2 less two hundred and twelve equal 62.2 and this less three-fourths times eight which is six, equals 56.2. Now in the chart pass along the line corresponding to 94.7 pounds until over 56 and the nearest curve shows the percentage of moisture in the steam to be 0.92.

In the diagram or chart the spaces between abscissa 80 and 90 and between ordinates 40 and 50 are shown provided with divisional or intermediate lines. Such divisional lines can of course be extended over the whole chart or omitted altogether as deemed sufficient for the requisite accuracy in result.

What I claim as new, and desire to secure by Letters Patent, is—

1. The combination with the vessel or body B provided with a thermometer and a pressure gage, of an entering pipe leading into the vessel and provided with a mouth or nozzle made convergent at the place of entry into the vessel, substantially as described.

2. The combination with the vessel or body B having a closed top and an opening bottom and provided with a thermometer and a pressure gage, of an entering pipe formed or secured on the vessel and provided with a mouth or nozzle made convergent at the place of entry into the vessel, substantially as described.

3. The combination with the vessel or body B provided with a pressure gage and with a thermometer cup or holder fixed to said vessel, of an entering pipe fixed to the vessel and provided with a mouth or nozzle made convergent at the place of entry into the vessel, substantially as described.

4. The combination with the vessel or body B provided with a thermometer cup and with a manometer and manometer cock, of an entering pipe leading into the vessel and provided with a mouth or nozzle made convergent at the place of entry into the vessel, substantially as described.

In testimony whereof I have hereunto set my hand in the presence of two subscribing witnesses.

ROLLA CLINTON CARPENTER.

Witnesses:
W. HAUFF,
E. F. KASTENHUBER.